United States Patent [19]

Robbins

[11] Patent Number: 4,468,774
[45] Date of Patent: Aug. 28, 1984

[54] FACE PUMPED LASER HOST MOUNTING

[75] Inventor: Alexander G. Robbins, Vestal, N.Y.

[73] Assignee: General Electric Company, Burlington, Vt.

[21] Appl. No.: 329,214

[22] Filed: Dec. 10, 1981

[51] Int. Cl.$^3$ .............................................. H01S 3/05
[52] U.S. Cl. ...................................... 372/34; 372/35; 372/66; 372/72
[58] Field of Search ...................... 372/66, 70, 34, 36, 372/35, 72

[56] References Cited

U.S. PATENT DOCUMENTS 4,354,272  10/1982  Schwob et al. ...................... 372/36
4,378,601   3/1983  Eggleston et al. .................... 372/66

Primary Examiner—James W. Davie
Attorney, Agent, or Firm—Bailin L. Kuch

[57] ABSTRACT

A mounting arrangement for mounting a slab of laser host material in a face pumped laser is provided which is operable to isolate the host from flexing caused by differential thermal expansion of the laser housing relative to the host mounting members. First and second stainless steel pedestals are respectively secured to the aluminum housing and first and second elongated, stainless steel rail support members are pivotally secured, respectively, through a pair of flex pivots each, to the first and second pedestals for isolating the support members from flexure of the pedestals. The host is secured between and to the rail support members by bonding with an RTV compound. In the preferred embodiment, one of the rail support members is provided with a diaphragm on one of its sides along the entire length thereof, to which is bonded one of the sides of the host, thus providing further isolation of the host from stresses caused by thermal expansion.

10 Claims, 4 Drawing Figures

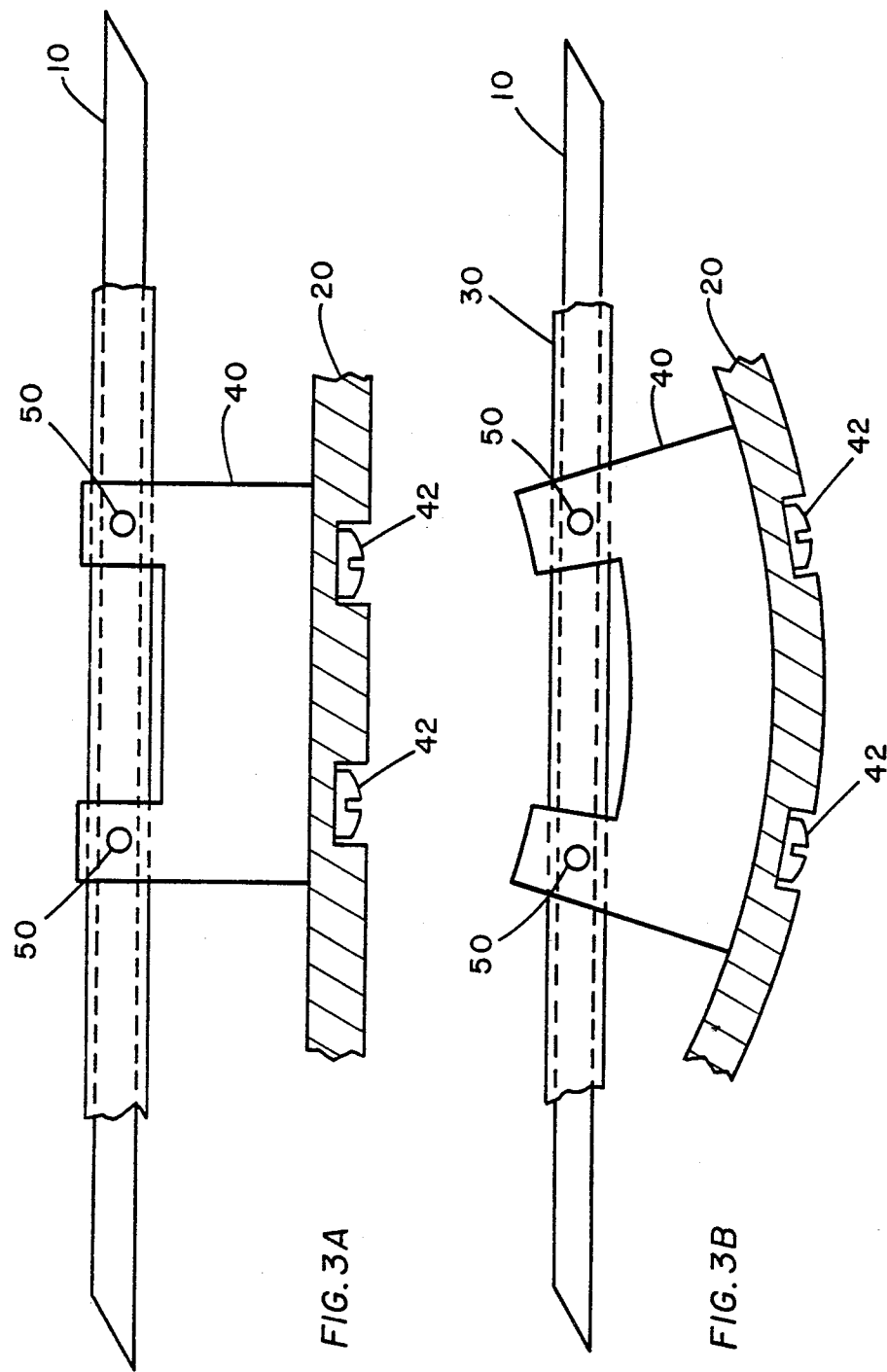

FACE PUMPED LASER HOST MOUNTING

The Government has rights in this invention pursuant to Contract No. F33615-80-C-1104 awarded by the Department of the Air Force.

BACKGROUND OF THE INVENTION

1. Field of the Invention

This invention relates to a total-internal reflection face pumped laser, and more particularly, to such a laser providing means for fixedly mounting the host within the housing such that the host is substantially isolated from flexing caused by differential thermal expansion of the housing relative to the mounting members.

2. Description of the Prior Art

The face pumped laser, and particularly that of the total internal reflection type, utilizes the major faces of the host for optical pumping thereof and the ends are used for the laser beams. The only surfaces of the host available for mounting are the edges. The prior art has typically provided a host having wedge-shaped edges and mounting was accomplished by chevron-shaped or double-vee wedge rails supported on four sloping feet. The rails also serve to provide the required thermal insulation. Spring-loaded pusher pins serve to clamp the assembly together within the laser head or housing. In operation, differential thermal expansion between the aluminum housing, the glass laser host and the wedge rails cause the rails to rotate about the host, thus producing slab misalignment and flexure of the host itself. The multiple internal reflections within the flexed host result in a deviation angle or optical misalignment of oscillator and amplifier laser beams. This angular deviation results in serious performance degradation.

The prior art has also relied upon springloaded plungers mounted through the housing sidewalls applying forces from the sides of the host to secure the host in place in the laser housing. However, such an arrangement has much the same effect as the mounting arrangement discussed above. Furthermore, both examples of the prior art provide support for the host at only four points. Vibration normal to the plane of the supports results in flexure of the host and a corresponding angular deviation which also causes degraded performance. In addition, the longitudinal restraint typically requires large forces since only the friction between the supports and the host acts to restrain longitudinal motion.

Another form of prior art is shown in U.S. Pat. No. 4,378,601, issued Mar. 29, 1983, to John M. Eggleston, III et al, which consists of a rectangular frame enclosing the ends and sides of the slab. The opening in the frame is for pump radiation and slots are provided in the ends of the frame for the lasing radiation. The members of the frame have a U-shaped cross section to receive the slab. This art generally restrains the slab so that there is no gross movement. For rough usage, such as a laser mounted on a vehicle or aircraft, the U-shaped members of the rectangular frame would have to exactly fit the slab in order to fully restrain the slab. If the fit were not exact under all conditions of temperature, the slab would be fretted, chipped and cracked by rattling around inside the rectangular frame.

Prior art for mounting rods by means of clamps or rings, as shown in U.S. Pat. No. 4,354,272, issued Oct. 12, 1982, to Hans-Peter Schwob et al, rely on the fact that flexure of the rod due to small misalignments of the clamps does not affect the output alignment. For slabs with total internal reflections, flexure of the slab is equivalent to misalignment of the laser resonant cavity. Thus, clamping, without means of eliminating flexure of the host slab, is not adequate for supporting and restraining a slab.

Consequently, a need exists for a mounting structure for the host of a face pumped laser which is capable of isolating the host from flexing caused by differential thermal expansion between the laser housing and the host mounting means.

It is therefore an object of the present invention to provide an improved host mounting structure for a face pumped laser.

It is a further object of the present invention to provide a laser host mounting means for a face pumped laser which is operable to isolate the laser host from flexing caused by differential thermal expansion of the laser housing relative to the host support members.

Other objects and advantages of the present invention will become apparent as the description thereof proceeds.

SUMMARY OF THE INVENTION

In accordance with the present invention, there is provided in a total-internal reflection type face pumped laser of the type including an elongated homogeneous slab of active laser host having a pair of optically plane faces extending substantially parallel to one another for receiving radiation for effecting optical pumping of the host, the slab also having a pair of parallel sides, and a hollow housing for receiving therein the host slab, means for fixedly mounting the host slab within the housing. Included are first and second elongated support members, each being approximately coextensive with the host slab for supporting therebetween the host slab at its parallel sides. Means are provided for bonding the parallel sides of the host slab to the respective support members. Also included are first and second pedestals, each fixedly secured to the hollow housing, the first pedestal being secured to the first support member through a first pair of pivots and the second pedestal being secured to the second support member through a second pair of pivots. All the pivots have their respective centers located substantially on a plane through the center of the host slab and parallel with the optically plane faces thereof and are the means for isolating the support members from the flexure of the pedestals which is caused by differential thermal expansion.

BRIEF DESCRIPTION OF THE DRAWING

In the accompanying drawing:

FIGS. 3A and 3B are a partial view taken through section III—III of FIG. 2 showing the effect of differential thermal expansion. FIG. 3A shows the room temperature condition and FIG. 3B shows the elevated temperature condition.

DESCRIPTION OF THE PREFERRED EMBODIMENT

Figure 1:
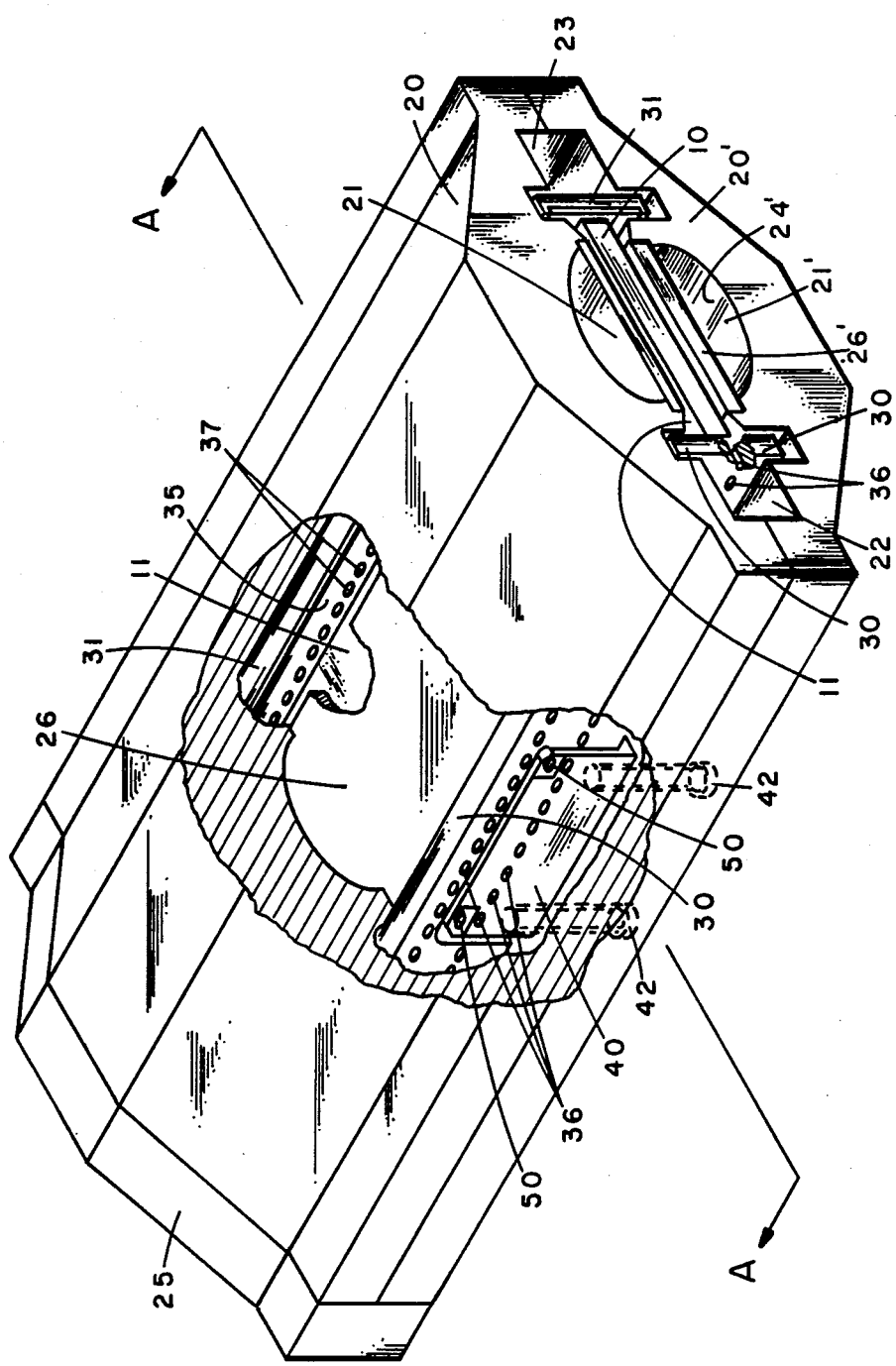
FIG. 1 is an isometric view of the preferred embodiment of the present invention, partially broken away to show details of the laser host mounting structure.

In accordance with the present invention and referring now generally to FIGS. 1, 2, 3A and 3B there is shown the preferred embodiment of the total-internal reflection type face-pumped laser host mounting means of the present invention. An elongated homogeneous slab of active laser host 10 includes a pair of optically plane faces 11 and 11' extending substantially parallel to one another for receiving radiation from a source (not shown) but as shown, for example, in U.S. Pat No. 4,233,567, issued Nov. 11, 1980 to J. P. Chernoch for effecting optical pumping of the host. Host slab 10 also includes a pair of parallel sides 12 and 12'. A hollow housing having a top 20 and a bottom 20' and a pair of end plates 25 (only the rear one of which is shown, the front end plate having been removed for clarity) is provided for receiving therein host slab 10. In the preferred embodiment, the hollow housing 20 and 21 and the end plates 25 are made of a lightweight material such as aluminum to reduce weight.

In a laser of the type shown, there is typically provided a pair of radiation sources such as, for example, flash lamps (not shown) which may be suitably mounted within the cavities 21, 21' of the housing in a manner known to those skilled in the art. With such an arrangement, surfaces 24 and 24' serve as reflectors to direct radiation from the flash lamps to the faces 11 and 11' of laser host 10. Furthermore, the top and bottom and the end plates of the housing may be secured together in any suitable manner, as for example by bolts and fluid tight seals may be provided as required.

First and second elongated support members such as rails 30 and 31, are provided each being approximately coextensive with the host slab 10 for supporting therebetween the host slab 10 at its parallel sides 12 and 12'. In the preferred embodiment, the rails 30 and 31 are of a material, such as stainless steel, that substantially matches the coefficient of thermal expansion of the host slab 10.

Means are provided for bonding the parallel sides 12 and 12' of host slab 10 to the rails 30 and 31 respectively; in the preferred embodiment, a silicone rubber adhesive serves as the bonding means. Any suitable adhesive is acceptable, such as, for example, urethane or butyl compounds.

Figure 2:
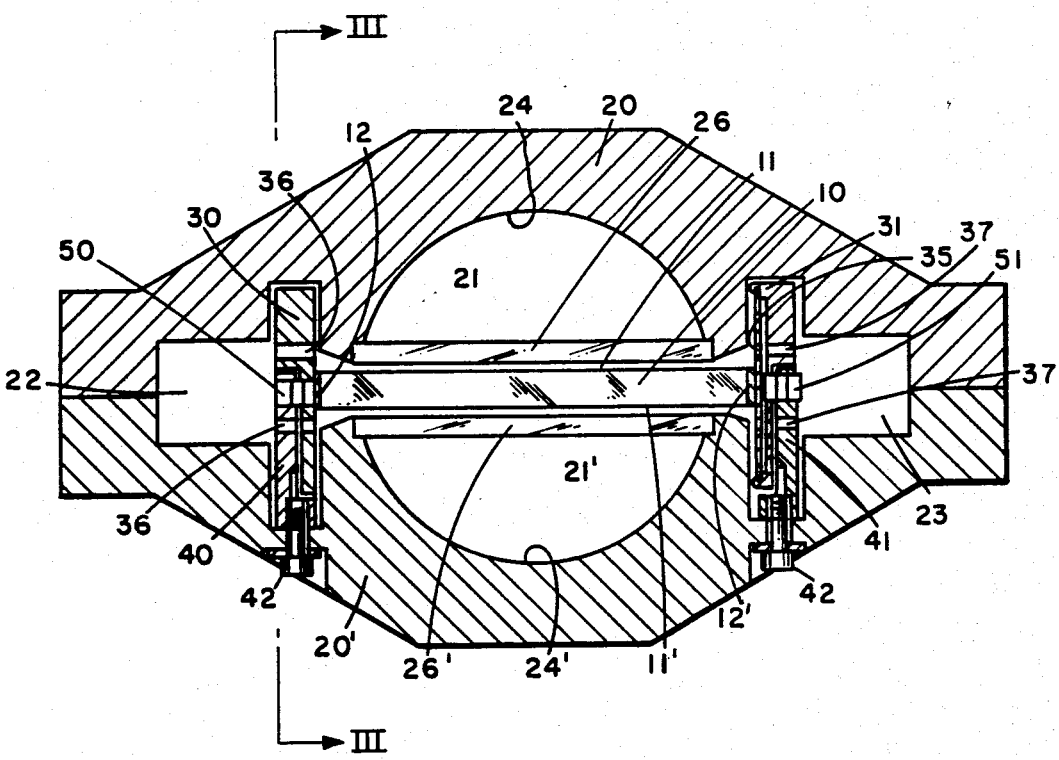
FIG. 2 is a cross-sectional view taken through section A—A of FIG. 1 and showing in more detail the relationship of the pivoting members of the host mounting structure.

First and second pedestals 40 and 41 are provided as the means to support and position the rails 30 and 31 relative to the housing 20'. First pedestal 40 is secured to the housing 20' by two screws 42. The first pedestal 40 is attached to the rail 30 by a first pair of flex pivots 50. The pair of flex pivots provide the means of supporting and positioning the rail without coupling bending moments from the pedestal to the rail which would result in bending of the rail and, hence, bending of the laser host slab. The second pedestal 41 is secured to the housing 20' by two screws 42. The second pedestal 41 is attached to the rail 31 by a second pair of flex pivots 51 (only one of which is shown in FIG. 2). All four flex pivots 50 and 51 have their respective centers located substantially on a plane through the center of the host slab 10 and parallel with the optically plane faces 11 and 11' thereof. It is contemplated that other types of pivot members may be utilized. In the preferred embodiment, the material of the first and second pedestals 40 and 41 are the same as that of the rails 30 and 31 so as to match their coefficients of thermal expansion.

To prevent undue compression or tension on the bonds due to relative motion of the rails 30 and 31 with respect to the slab 10 caused by differential thermal expansion, rail 31 is provided along one entire face with a flexible member, such as a diaphragm 35, to which is secured parallel side 12' of the host slab 10. This is accomplished by hollowing out the rail along one side thereof for the whole length of the rail and securing thereto, as by welding, a thin elongated metallic sheet.

Referring to the drawings, one can see that an input port 22 is provided for receiving a fluid coolant. The fluid coolant entering the port 22 is allowed to pass through a plurality of holes 36, extending the length of the rail 30 in two rows, thence to flow therethrough and across the optically plane faces 11 and 11' of the laser host 10 and to exit through a plurality of holes 37 also in two rows (only one of which can be seen) in the second rail 31. The fluid coolant then is free to exit from the exit port 23. The fluid coolant is directed across the faces 11 and 11' and is constrained by the inclusion of a pair of glass plates 26 and 26' secured respectively to housing members 20 and 20' by appropriate means. Fluid coolant is thus kept from the cavities 21 and 21' and isolated from the flash lamp radiation sources (not shown). (Should it be desirable to cool the flash lamps, a separate flow of coolant would be provided.) Such an arrangement serves to remove excess heat from the host slab.

With the laser host mounting arrangement as shown and described herein, when the assembly, which includes the host slab, the rails, the pedestals, and laser housing, is heated, the laser host slab 10 is isolated from flexure and stresses in the following manner. As the assembly is heated, the housing, which in the preferred embodiment is made from aluminum, tends to elongate more than the pedestals 40 and 41 which are in this embodiment formed of stainless steel. As in any bimetal array, there is a resulting curvature along the interface of the two metals. Since the respective pedestals are secured to the housing along the bottom section 20' thereof, the pedestal becomes elongated as a result of expansion of the housing. At the tops of the pedestals, which are not attached to the housing, there is less elongation as a result of such heating. Because of the flex pivots 50, 51, any flexure of the pedestals is not imparted to the rails and, therefore, the host slab is mounted on the rails that are isolated from flexure, i.e., does not flex when the pedestals and the housing flex. The flex pivots prevent pedestal distortion from reaching the rails. Thus, the host slab remains free of flexure stresses despite the fact that there is differential thermal expansion in the laser assembly.

The host slab also remains free of vibration flexure since it is bonded to the rails along its entire length. Thus, each element of the length of the slab 10 is supported such that vibrational acceleration drives each element to the same degree. Hence, all elements of the slab move the same amount and there is no flexure as there would be with discrete supports. Furthermore, the bond between the slab and the rails acts to restrain longitudinal motion.

While a laser host mounting structure has been described in what is presently considered to be a preferred embodiment of the invention, it will be apparent to those skilled in the art that various changes and modifications may be made in the structure and in the instrumentalities utilized without departing from the true spirit and scope of the invention.

I claim:

1. In a face-pumped laser of the type including an elongated homogeneous slab of active laser host having a pair of optically plane faces extending substantially parallel to one another for receiving radiation for effecting optical pumping of the host, the slab also having a pair of parallel sides; and a hollow housing for receiving therein the host slab; means for fixedly mounting the host slab within the housing, comprising:

first and second elongated support members, each being approximately coextensive with the host slab for supporting therebetween the host slab at its parallel sides;

means for bonding the parallel sides of the host slab to the respective support members; and first and second pedestals, each fixedly secured to the housing, the first pedestal being secured to the first support member through a first pair of pivots and the second pedestal being secured to the second support member through a second pair of pivots, all the pivots having their respective centers located substantially on a plane through the center of the host slab and parallel with the optically plane faces thereof;

whereby the host slab is substantially isolated from flexing caused by differential thermal expansion of the housing relative to the support members.

2. The invention of claim 1 wherein the sides of the host slab are substantially parallel to each other and orthogonal to the adjacent optically plane faces and wherein each of the first and second elongated support members is a rigid bar, the host slab being bonded at one of its sides to one of the faces of the first support member and at its other side to one of the faces of the second support member.

3. The invention of claim 2 wherein the host slab is bonded to the respective support members with an RTV compound.

4. The invention of claim 2 wherein the first pedestal is secured to the first support member by a pair of spaced-apart flex pivots and the second pedestal is secured to the second support member by a second pair of spaced-apart flex pivots, the longitudinal axis of each pivot lying on the plane parallel with the optically plane faces of the host slab and passing through the center of the host slab.

5. The invention of claim 2 wherein the respective support members are provided with a plurality of apertures for allowing the passage of a fluid coolant across the optically plane faces of the host slab for effecting cooling of the host slab.

6. The invention of claim 2 wherein one of the first and second support members is provided, along one entire face, with a flexible member to which is secured one of the parallel sides of the host slab, the flexible member serving to relieve stress on the bonds in the presence of relative motion of the first and second support members caused by differential thermal expansion.

7. The invention of claim 6 wherein said one of the first and second support member is provided with a hollowed-out portion along the length of one face thereof and the flexible member is a thin, elongated metallic sheet secured to said support member so as to allow freedom of flexure of the member.

8. A mounting arrangement for securing a laser host within a hollow laser housing, comprising:

an elongated homogeneous active laser host slab, the host slab having a pair of optically plane faces extending substantially parallel to one another for receiving radiation for effecting optical pumping of the host, the host slab also having a pair of parallel sides, each being substantially orthogonal to the optically plane faces;

first and second elongated support bars, each bar having a pair of parallel faces; the bars being arranged in a spaced-apart relationship such that their respective faces are parallel and for receiving therebetween the host slab, the first support bar being bonded to one of the parallel sides of the host slab, the second support bar being bonded to the other of the parallel sides of the host slab, and first and second pedestals, each arranged to be fixedly secured within the laser housing, the first pedestal being secured to the first support bar through a first pair of spaced-apart flex pivots, the second pedestal being secured to the second support bar through a second pair of spaced-apart flex pivots, the logitudinal axis of each flex pivot lying on a plane substantially parallel with the optically plane faces of the host slab and passing substantially through the center of the host slab; whereby flexing and distortion of the host slab due to differential thermal expansion of the housing relative to the support bars is substantially prevented.

9. The invention of claim 8 wherein the first and second support bars are provided respectively with a plurality of apertures therethrough for allowing the passage of a fluid coolant across the optically plane faces of the host slab for effecting cooling thereof.

10. The invention of claim 8 wherein one of the first and second support bars is provided along the length of one of the parallel faces with a flexible diaphragm to which is bonded one of the parallel sides of the host slab, the flexible diaphragm serving to relieve stress at the bonded surfaces resulting from thermal expansion.

* * * * *